(12) United States Patent
Leonidovich et al.

(10) Patent No.: US 8,396,155 B2
(45) Date of Patent: Mar. 12, 2013

(54) ADVANCED METHOD FOR DECODING IN THE MIMO SYSTEM AND APPARATUS FOR IMPLEMENTING THEREOF

(75) Inventors: Rog Andrey Leonidovich, Moscow (RU); Melnikov Alexey Olegovich, Moscow (RU); Chernysh Alexander Victorovich, Moscow (RU); Golikov Michael Vladimirovich, Moscow (RU); Soongyoon Choi, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 481 days.

(21) Appl. No.: 12/657,087

(22) Filed: Jan. 12, 2010

(65) Prior Publication Data

US 2010/0177837 A1     Jul. 15, 2010

(30) Foreign Application Priority Data

Jan. 12, 2009   (RU) ................................ 2009100150

(51) Int. Cl.
*H04B 7/02*     (2006.01)
(52) U.S. Cl. ........ 375/267; 375/316; 375/347; 375/349; 375/262; 375/259; 375/260; 375/261
(58) Field of Classification Search .................. 375/316, 375/267, 347, 349, 262, 259, 260, 261
See application file for complete search history.

(56) References Cited

U.S. PATENT DOCUMENTS

| | | | |
|---|---|---|---|
| 7,702,050 B2* | 4/2010 | Su ................................. | 375/347 |
| 7,720,169 B2* | 5/2010 | Reuven et al. ................. | 375/267 |
| 2007/0032206 A1* | 2/2007 | Hwang et al. ................. | 455/101 |
| 2007/0127589 A1* | 6/2007 | Hwang et al. ................. | 375/267 |
| 2008/0152032 A1* | 6/2008 | Lee et al. ....................... | 375/260 |
| 2008/0225976 A1* | 9/2008 | Prasad et al. .................. | 375/267 |
| 2009/0279644 A1* | 11/2009 | Maru ............................. | 375/340 |

OTHER PUBLICATIONS

Tsuguo Maru, PCT/JP2006/306282, published on May 10, 2006.*

* cited by examiner

*Primary Examiner* — Siu Lee (57) ABSTRACT

A mobile station is capable of detecting a signal in the wireless communication systems using the Multiple Input Multiple Output (MIMO). The mobile station includes an apparatus that determines a vector of signals received by several receiving antennas. The apparatus estimates a channel between transmitting antenna and receiving antenna; forms a channel matrix; establishes, based on the channel state data, an order for detecting symbols transmitted by different transmitting antennas; calculates weight coefficients for detecting the symbols in the MIMO system; detects the symbols serially in the established order on the basis of the received signal vector; calculates the Euclidean distance between the detected symbols and the symbol constellation points; determines values of the Logarithmic Likelihood Ratio (LLR) for estimating the soft output bit probability, and forms a group of the most probable candidate symbols from the points of the symbol constellation.

20 Claims, 5 Drawing Sheets

ADVANCED METHOD FOR DECODING IN THE MIMO SYSTEM AND APPARATUS FOR IMPLEMENTING THEREOF

CROSS-REFERENCE TO RELATED APPLICATION(S) AND CLAIM OF PRIORITY

The present application is related to and claims priority to an application entitled "ADVANCED METHOD FOR DECODING IN THE MIMO SYSTEM AND APPARATUS FOR IMPLEMENTING THEREOF" filed in the Russian Patent Office on Jan. 12, 2009 and assigned Serial No. 2009100150, the contents of which are incorporated herein by reference.

TECHNICAL FIELD OF THE INVENTION

The present application relates generally to the radio communication field and particularly to the wireless communication systems using the Multiple Input Multiple Output (MIMO) principle and decoding technique based on the Ordered Successive Interference Cancellation (OSIC).

BACKGROUND OF THE INVENTION

An effective signal detection tool is necessary for a high-quality communication in the MIMO-system. Specifically, a V-BLAST detection scheme, as disclosed in P. W. Wolniansky, G. J. Foschini, G. D. Golden, and R. A. Valenzuela, "V-BLAST: an architecture for realizing very high data rates over the rich-scattering wireless channel," in URSI International Symposium on Signals, Systems and Electronics, pp. 295-300, September), the contents of which hereby are incorporated by reference, employs the successive cancellation of the interference component, which does not require great computational resources and demonstrates good result when operating using rigid solutions at the output. However, this scheme includes a significant reduction in its effectiveness due to the maximum likelihood (ML) scheme that provides soft solutions, but is very strict to the computational resources.

One technical solution is described in the US Patent Application No. 2008/0152032A. This application proposes the method and apparatus that permit to use the signal detection based on the OSIC in the MIMO systems, the signal detection allowing for estimating the output bit probability, thus obtaining soft solutions.

The MIMO transmission system using m transmitting (Tx) antennas and n receiving (Rx) antennas is described Equation 1:

$$y = Hx + v,$$ [Eqn. 1]

where H is the channel matrix of size n×m,
$x = [x_1 \ x_2 \ \ldots \ x_m]^T$ is the transmitted signal vector,
$y = [y_1 \ y_2 \ \ldots \ y_n]^T$ is the received signal vector,
$v = [v_1 \ v_2 \ \ldots \ v_n]^T$ is the noise component vector.

The classification procedure regulating the sequence for determining the transmitted symbols is based on the principle of the maximal norm of the channel coefficient matrix column, which permits primarily to choose the Tx antenna having the maximal value of the channel coefficient vector.

The detection method provides for estimating all possible transmitted signals layerwise, where the signal transmitted by one Tx antenna is regarded as the layer. Thus, such as in the case of the 16 QAM (quadrature amplitude modulation), sixteen (16) candidates are calculated first in the layer_1, which is determined as the best according the aforementioned classification procedure. Using the MMSE-OSIC method, symbols belonging to other layers are detected for every symbol from the layer_1, which results in forming sixteen (16) candidate vectors. K best candidates are separated amongst these sixteen (16) vectors, where K is a parameter which is set as K=3 for the example in the above application. The best candidates are determined in accordance with the minimum Euclidean distance criterion:

$$d = \|y - Hx_i\|^2,$$ [Eqn. 2]

where $x_i$ is a candidate vector. Moreover, when calculating the Euclidean distance (2), the Logarithmic Likelihood Ratio (LLR) for the soft solution is determined:

$$LLR(b_i) = \min_{x \in S_{i,0}} \|y - Hk\|^2 - \min_{x \in S_{i,1}} \|y - Hk\|^2,$$ [Eqn. 3]

where i=1, . . . M; M is determined on the basis of the modulation type (M=4 in the case of the 16 QAM),
$S_{i,0} = \{x | b_i = 0\}$ means symbols, for which the i-th bit is '0,'
$S_{i,1} = \{x | b_i = 1\}$ means symbols, for which the i-th bit is '1.'

Thereafter, by means of scanning all possible symbols in the layer 2 when fixing K symbols from the layer_1, a next group of candidate vectors (consisting of K vectors) is determined. The solution vector for other layers is determined also using the MMSE-OSIC method. Thus, it is necessary to test m*K candidates. Values of the Logarithmic Likelihood Ratio (LLR) for the layer_2 are calculated by the Equation 3. Additionally, the LLR values for the layer_1 could be recalculated in the case, if a shorter Euclidean distance is obtained in comparison with the one calculated in the previous layer. Such procedure is similarly applied for all other layers. In order for processing every layer, the respective MMSE filter is determined:

$$W_1 = (H_1^H H_1 + \sigma^2 I_1)^{-1} H_1^H,$$ [Eqn. 4A]

where $H_1 = [h_2 \ h_3 \ h_m]$ is the matrix H after exclusion of the column corresponding to the first layer, $$W_2 = (H_2^H H_2 + \sigma^2 I_2)^{-1} H_2^H,$$ [Eqn. 4B]

where $H_2 = [h_3 \ \ldots \ h_m]$ is the matrix H after exclusion of the columns corresponding to the first and second layers.

$$W_{m-1} = (H_{m-1}^H H_{m-1} + \sigma^2 I_{m-1})^{-1} H_{m-1}^H,$$ [Eqn. 4C]

where $H_{m-1} = [h_m]$ is the last column of the matrix H.

The disadvantage of the closest analogue consists in that, whereas the complexity degree of such a method is significantly lower than of the ML method, it is still nevertheless very high, especially in the case when the number of the Tx and Rx antennas is great.

SUMMARY OF THE INVENTION

To address the above-discussed deficiencies of the prior art, it is a primary object to provide an improved method for detecting a signal in the MIMO system, which method possesses an accuracy close to the maximum likelihood technique, but less strict to the computational resources, and, second, in developing an apparatus for implementing such a method.

In some embodiments, provided is a method for detecting a signal in the wireless communication systems using the Multiple Input Multiple Output (MIMO) principle. The method includes determining a vector of signals received by several receiving antennas; estimating a channel between every transmitting antenna Tx and every receiving antenna Rx; forming a channel matrix; establishing, based on the channel state data, an order for detecting symbols transmitted by different antennas Tx; calculating weight coefficients for detecting the symbols in the MIMO system; detecting the symbols serially in the established order on the basis of the received signal vector; calculating the Euclidean distance between the detected symbols and the symbol constellation points; determining values of the Logarithmic Likelihood Ratio (LLR) for estimating the soft output bit probability, and forming a group of the most probable candidate symbols from the points of the symbol constellation, wherein determining, at the stage n, the Euclidean distance by means of the normalized sum of the Euclidean distances $$d_{i,k} = d_i + \frac{d_k}{\sigma_n^2},$$

where $d_i$ is the Euclidean distance calculated at the previous stage for the candidate having the index i, $\sigma_n^2$ is an estimation of the error variance in detecting the symbol at the stage n, $d_k$ is the Euclidean distance between the detected symbol and the point k of the signal constellation. This latter distance is calculated for all constellation points and for every candidate symbol from the group of the candidates formed at the previous stage, then forming a new group of the candidate symbols based on the minimum normalized Euclidean sum principle; and thereupon canceling the candidate symbols from the updated received data vector.

In some embodiments, provided is an apparatus that implements the claimed method for detecting a signal in the wireless communication systems using the Multiple Input Multiple Output (MIMO) principle. The apparatus is operable to employ several receiving antennas Rx. The apparatus includes a signal sorter establishing an order for detecting symbols, every of those symbols being transmitted using one transmitting antenna Tx; a weight calculator determining the weight coefficients of the filter for detecting symbols in the MIMO system; a symbol detector estimating a symbol transmitted by one antenna Tx and determining the estimation error variance; a Euclidean distance calculator and Logarithmic Likelihood Ratio (LLR) estimator determining the Euclidean distance between the detected symbol and the signal constellation points, as well as the Logarithmic Likelihood Ratio (LLR) value on the basis of the Euclidean distances; a best symbol candidate former determining the most probable symbol constellation points transmitted; a candidate canceller subtracting the symbol transmitted by one antenna Tx from the received signal vector. The input of the signal sorter is fed by an information on the parameters of a channel between every antenna Tx and every antenna Rx. The output of the signal sorter is connected with the first input of the weight calculator. The second input of the weight calculator is fed by an information on the signal/noise ratio. The output of the weight calculator is connected to the first input of the symbol detector. The second input of the symbol detector is fed by a received signal vector. The output of the symbol detector is connected with the input of the Euclidean distance calculator. The first output is connected with the second input of the symbol detector via the serially coupled best symbol candidate former and candidate canceller. The latter updates the received data vector without the eliminated candidate symbol. The updated vector is fed to the input of the symbol detector. The symbols transmitted by different antennas Tx are detected serially in accordance with the order determined by the signal sorter. The second output of the Euclidean distance calculator is the source for the data on the Logarithmic Likelihood Ratio (LLR) estimation. The apparatus structure distinguishes in that only the information on the detected symbol and detection error variance estimation is fed to the input of the Euclidean distance calculator. Thus, this module calculates the Euclidean distances to the constellation points and processes the LLR estimation only on the basis of the information on the detected symbol and modulation type.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1:
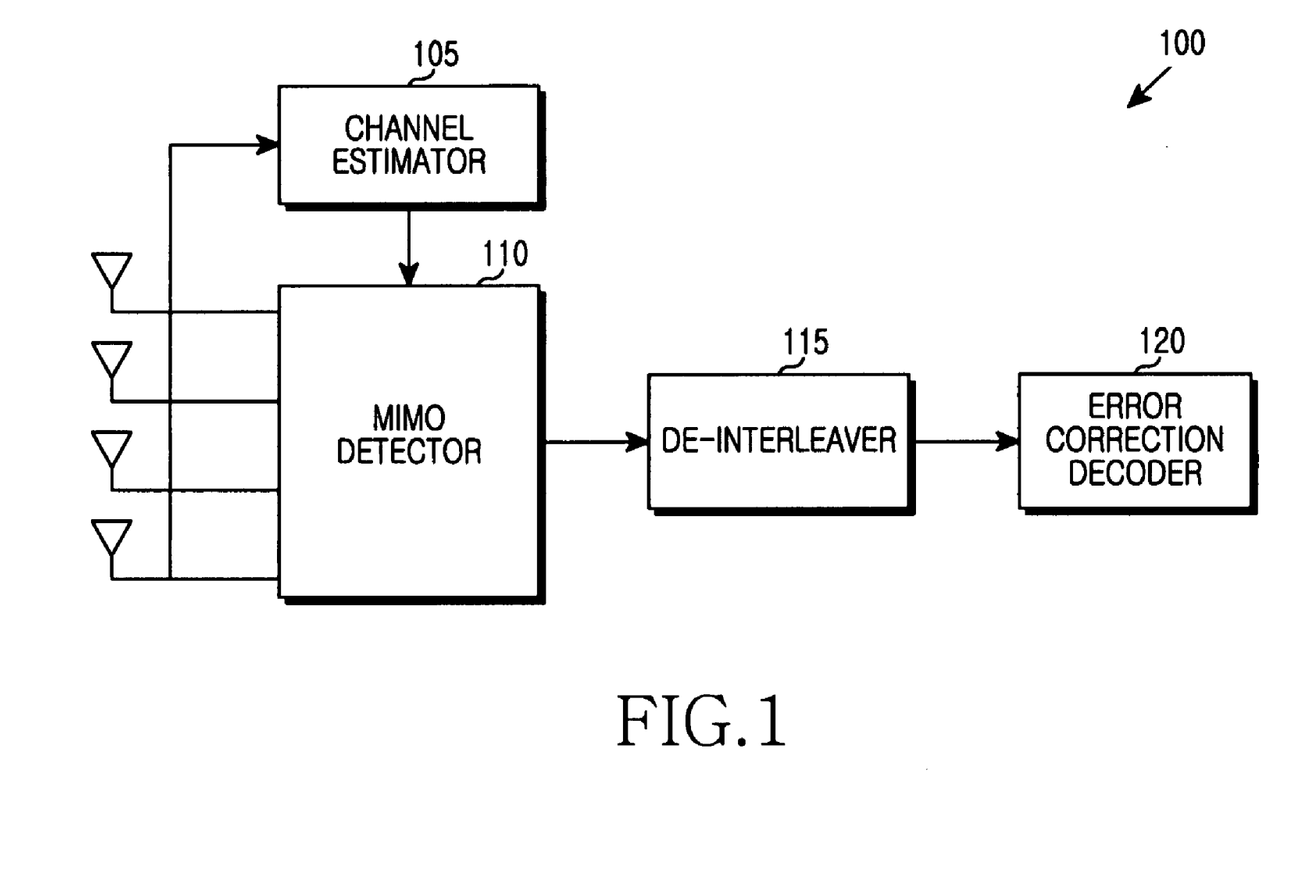
FIG. 1 illustrates a block diagram of the MIMO receiver.

FIG. 1 illustrates a block diagram of the MIMO receiver.

Referring to FIG. 1, the MIMO receiver 100 comprises a channel estimator 105, a MIMO detector 110, a de-interleaver 115 and an error correction decoder 120. The channel estimator 105 estimates signals from multiple antennas and provides estimation results to the MIMO detector 110. The MIMO detector 110 will be explained in FIG. 2. The de-interleaver 115 performs de-interleaving data provided from the MIMO detector 110. The error correction decoder 120 performs decoding data provided from the de-interleaver 115.

Figure 2:
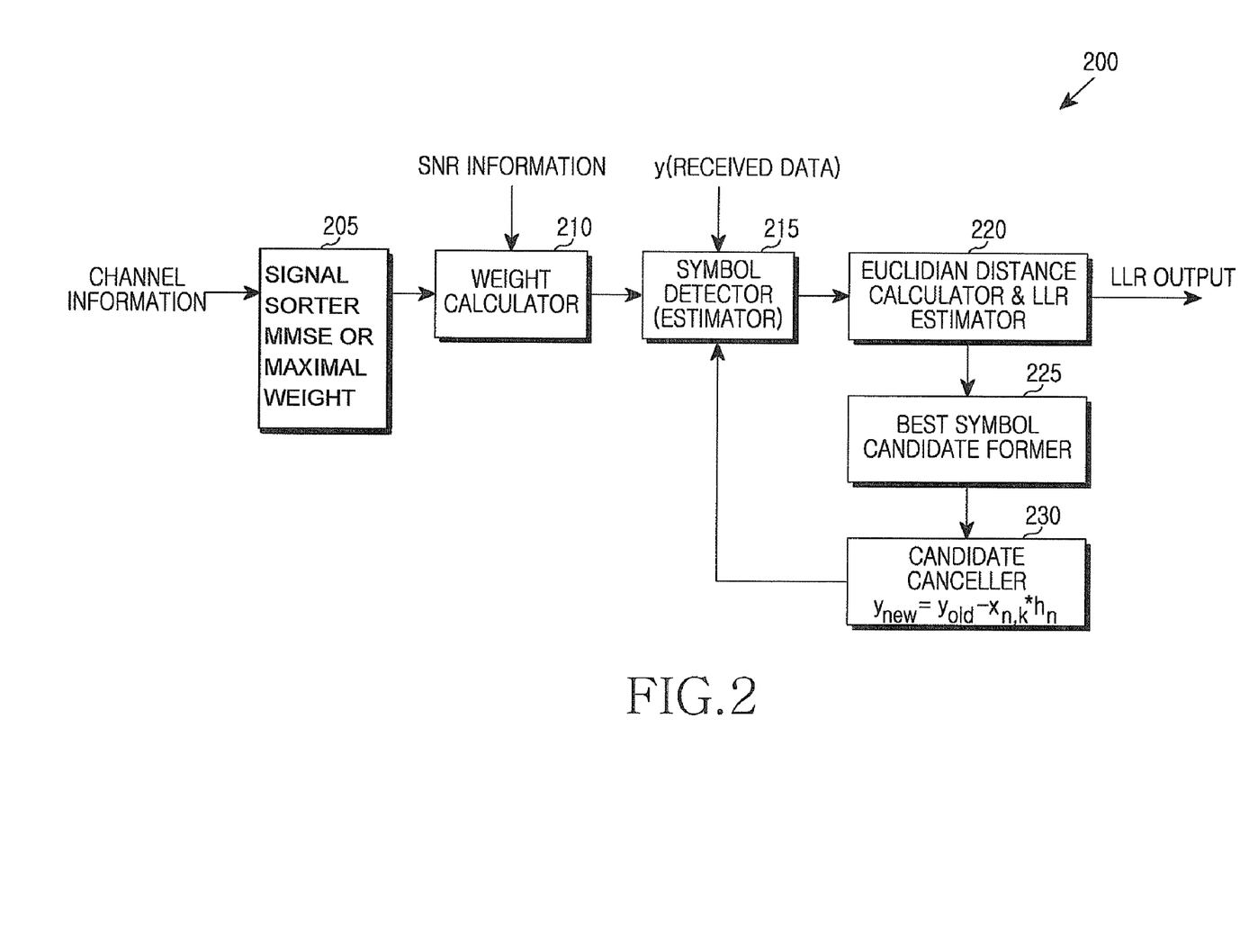
FIG. 2 illustrates a block diagram of the MIMO detector in accordance with embodiments of the invention.

The block diagram of the MIMO detector apparatus 200 implementing the proposed method is shown in FIG. 2. The signal sorter 205 determines an order for detecting symbols in accordance with the criterion of the minimum mean square error (MMSE) of the solution, or (in another embodiment) in accordance with the criterion of the maximal weight of the channel matrix column. This module is similar to a conventional channel sorter (312). The weight calculator 210 carries out the calculation of the MMSE matrix elements. This module is similar to a conventional homonymous module. The symbol detector 215 calculates the received symbol value by means of the MMSE technique. This module is similar to a conventional symbol detector. The Euclidean distance calculator and LLR estimator 220 performs the calculation of the Euclidean distances between the MMSE solution point and each point of the constellation for the given modulation type. The Euclidean distance calculator and LLR estimator 220 is similar in functionally to a conventional Euclidean calculator, however, it uses technique for calculating the Euclidean distances different from the prior art and uses other input data therefore. Conventional systems calculate the Euclidean distances between the received vector and the estimation of the received vector for the given set of the transmitted symbols. Thus, in convention systems, the received vector Y and the calculated estimation of this vector Hx are fed to the input of this module.

In embodiments of the present disclosure, however, the MMSE solution (the point on the complex plane) for the layer being processed is fed to the input of the Euclidean distance calculator and LLR estimator 220, which requires significantly less amount of the input data and simplifies the Euclidean distance calculation. Simultaneously, the Euclidean distance calculator and LLR estimator 220 performs the calculation of the LLR values. The best symbol candidate former 225 forms the group of symbol constellation points that include the least Euclidean distance relative to the point of the MMSE solution. This module is similar functionally to a conventional candidate group selector. The candidate canceller 230 subtracts the candidate symbol from the received signal vector. This module is similar to a conventional symbol substitution unit.

Figure 3:
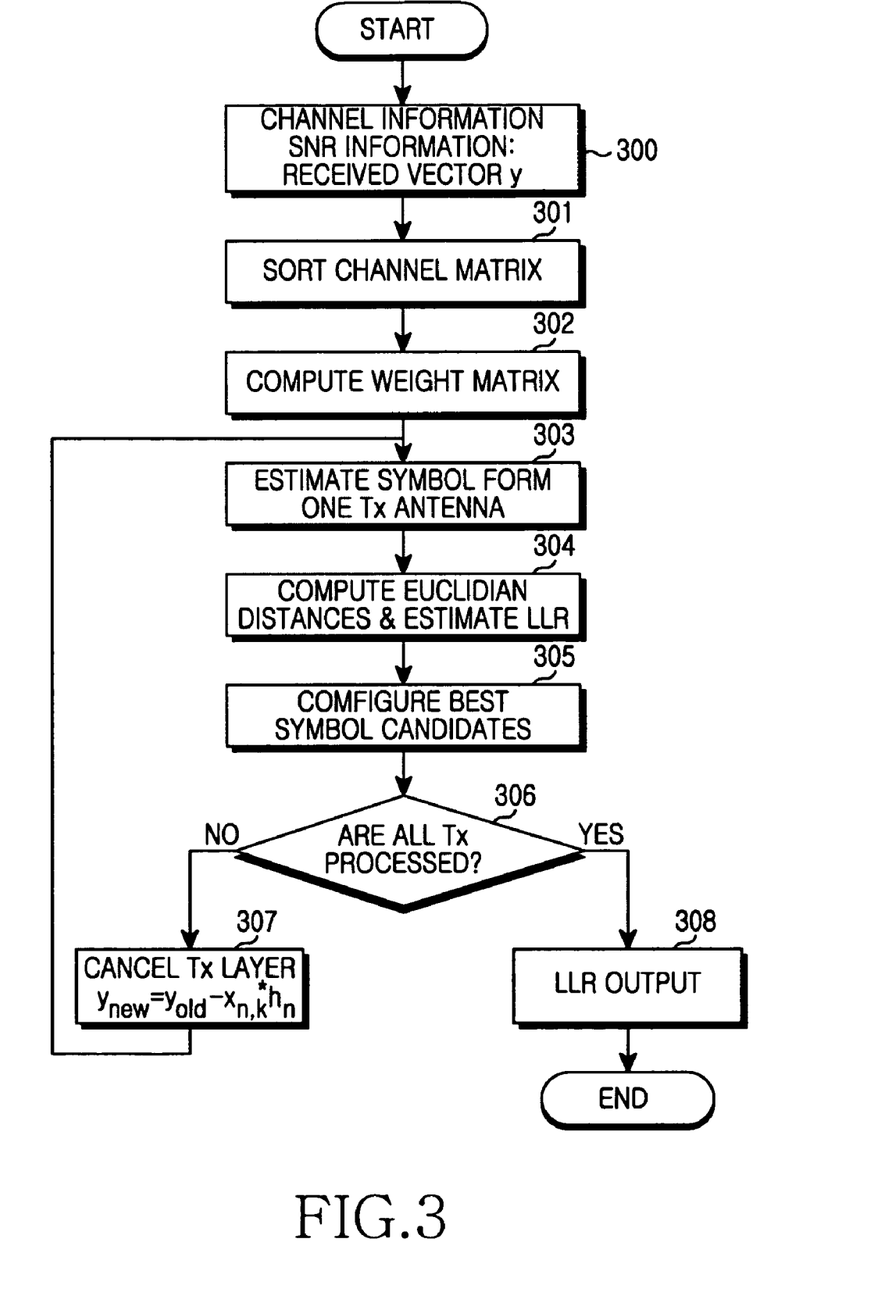
FIG. 3 illustrates a process of the signal detection in accordance with embodiments of the invention.

FIG. 3 illustrates a process of the signal detection in accordance with embodiments of the invention.

Referring to FIG. 3, in order for achieving the claimed result, the detection procedure the following stages Stage 0: channel information, SNR information and received vector for y are obtained in step 300.

Stage 1: the channel matrix H is estimated using the channel information.

Stage 2: the MMSE filters $W_i$ are determined using the SNR information in accordance with the Equation 4 in step 301, where i=0, . . . , m−1, the index 0 corresponds to the full matrix H, and the order (execution queue) of the MMSE-OSIC procedure is determined on the basis of the minimum error variance in the MMSE solution. This order is determined by sorting the moduli of the diagonal elements of the matrix WH, the maximal element corresponding to the first layer, then the sorting procedure is repeated for the reduced matrix $H_1$ using the diagonal elements $W_1 H_1$, and so forth up to the last layer.

Stage 3: the solutions are obtained using the received vector y using the MMSE filter (weight coefficients) for the layer_1, where the index "1" means the best layer for the sorting procedure in step 302: $\hat{x}_1 = wy$, where w is a row of the MMSE filter matrix, corresponding to the best layer and symbol is estimated from one TX antenna in step 303.

Stage 4: K best candidate symbols are determined for the layer_1 based on the minimal Euclidean distance between the detected symbol $\hat{x}_1$ and signal constellation points in step 304 and step 305: $d = \|\hat{x}_1 - A_k\|^2$ where $A_k \in S$, and the LLR values are determined for the layer_1:

$$LLR(b_i) = \left( \min_{A_p \in S_{i,0}} \|\hat{x}_1 - A_p\|^2 - \min_{A_t \in S_{i1}} \|\hat{x}_1 - A_t\|^2 \right) \frac{1}{\sigma_1^2} \quad \text{[Eqn. 4C]}$$

where $\sigma_1^2$ is the complex estimation of the error variance for the layer_1.

Stage 5: when all processes for symbols are not finished in step 306, the candidate symbols $A_k$ of the layer_1 are cancelled from the received vector y in step 307: $y_{1,k} = y - A_k h_1$, k=1, K, where $h_k$ is the column of the matrix H corresponding to the layer_1. Respectively, K updated received vectors $y_1$ are obtained with the cancelled layer_1.

Stage 6: repeating the stages from 3 to 5 for other layers (repeating with next Tx layer) is determined, the Euclidean distance d in the layer k (k>1) being determined in accordance to the equation:

$$d = \frac{d_{i,1}}{\sigma_1^2} + \frac{d_{i,2}}{\sigma_2^2} + \ldots + \frac{d_{i,k}}{\sigma_k^2}, \quad \text{[Eqn. 5]}$$

where i means the number of the candidate determined at the previous layer, the second index at y and the index at σ mean the number of the layer. For example, $d_{1,1}$ means the Euclidean distance determined for the candidate '1' in the layer_1, $d_{1,2}$ means the Euclidean distance determined for the candidate '1' in the layer_2, and so forth.

Once the Euclidean distances are determined, that is, when all processes for symbols are finished in step 306 the LLR values are calculated for the layer k in step 308 in accordance with the equation:

$$LLR(b_i) = \left( \min_{A_p \in S_{i,0}} d_p - \min_{A_t \in S_{i,1}} d_t \right), \quad \text{[Eqn. 6]}$$

where $d_p$, $d_t$ mean the Euclidean distances between the MMSE solution in the layer k and the constellation point having the proper bit $b_i$.

All other layers can be verified, excluding the first layer. K*M candidates should be taken into account when deriving the best candidates and calculating the LLR, where K is the number of candidates that are monitored after processing the previous layer, M is the number of points in the constellation.

Simplification of the proposed algorithm, in comparison with conventional systems, is achieved by means of canceling a series of the calculations therefrom. Particularly, when obtaining the solution for every layer excluding the first layer, K*M variants of the vector $y_i$ should be taken into account, while the solution in accordance with embodiments take into account only K variants. It should be noted that obtaining the MMSE solution for every layer requires m complex multiplications. Moreover, the conventional systems determined the Euclidean distance as a squared norm of the difference between the received vector y and Hx (see Equation 2), where the number of candidates is K*M. Even when taking into account that x belongs to the fixed constellation (components x are integers) and, therefore, the multiplication of Hx could be substituted by summing, the number of calculations remains great. In some embodiments, the Euclidean distance is calculated as the distance between the MMSE solution x, (which is simply a point in the complex space) and signal constellation points A ∈ S. Therefore, in the case of the QAM modulation, the squared norm of the difference between two complex values is calculated rather than between vectors.

In comparison with conventional systems, certain additional calculations are needed. Particularly, the Euclidean distance d is calculated using the Equation 5, which requires additional multiplications for summing fractions. Moreover, the MMSE filter is calculated for the full matrix H. However, these additional calculations are disparately small in comparison with the aforementioned complexity reduction. Table 1 provides a comparison of the number of the needed multiplications in the claimed algorithm and in conventional systems for the MIMO system 4×4 and the 16 QAM modulation. Four (4) candidates are used in the both algorithms. It should be noted that due to the fact that, in the case of 16 QAM modulation, the signals being transmitted are represented by integers (i.e., ±1, ±3), the multiplication can be substituted in many cases by an addition that requires significantly less hardware resources than the multiplication. This distinctive feature was taken into account when estimating the number of needed multiplications in the conventional systems and in the algorithm according to embodiments of the present disclosure.

Figure 4:
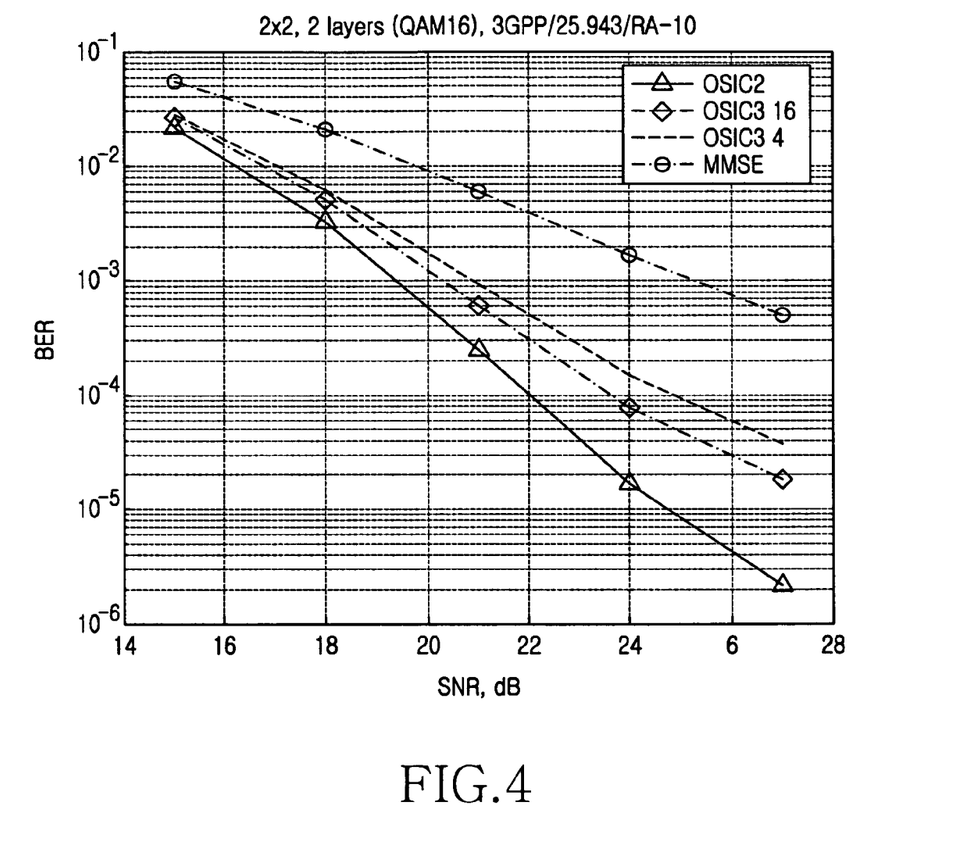
FIG. 4 illustrates the receiver operation (bit error probability) according to embodiments of the invention.

It should be also noted that, since the Euclidean distance in the conventional method is determined in accordance with the Equation 2, denying from multiplications in Hx and Wy$_i$ results in a great number of addition operator, which in any case increases the solution time. In embodiments of the present disclosure, this operation is absent.

ried out for the 2×2 MIMO V-BLAST system (each stream has the 16 QAM modulation) corresponding to the IEEE 802.16e standard having the convolution encoder and Viterbi decoder. The channel model is 3GPP/25.943/RA-10. The signal/noise ratio (SNR) is determined as the ratio of the signal energy irradiated by all Tx antennas to the noise energy in every Rx antenna.

Figure 5:
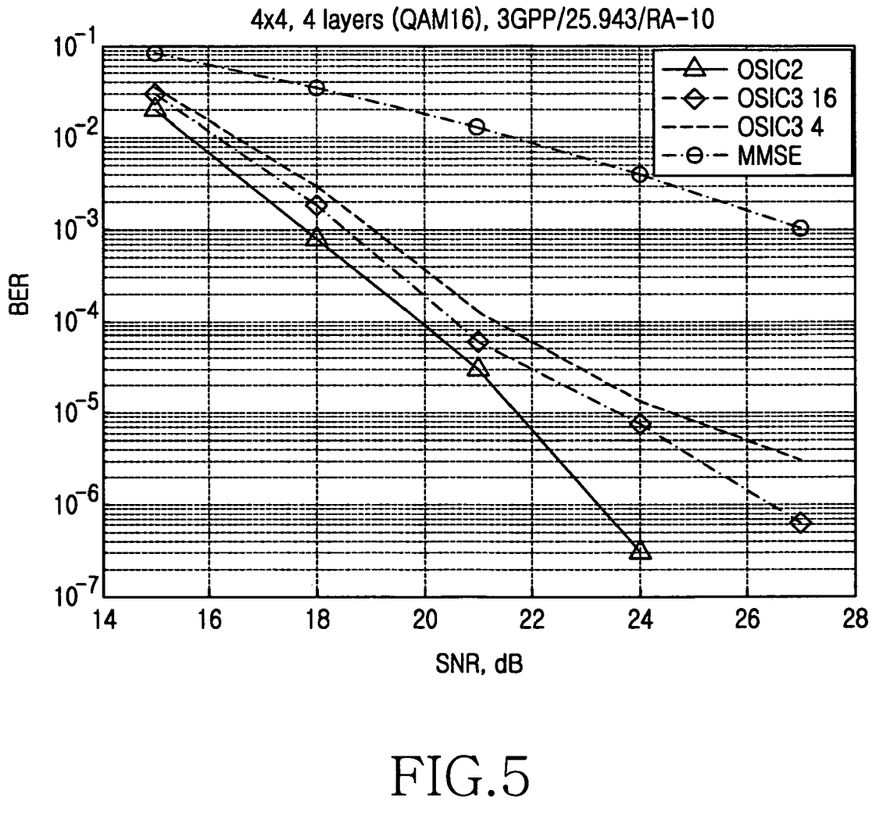
FIG. 5 illustrates the receiver operation (bit error probability) according to embodiments of the invention.

FIG. 5 illustrates the receiver operation (bit error probability) according to embodiments of the invention, where the proposed solution is compared with the MMSE MIMO receiver and a conventional system. The simulation was carried out for the 4×4 MIMO V-BLAST system (each stream has the 16 QAM modulation) corresponding to the IEEE 802.16e standard having the convolution encoder and Viterbi decoder. The channel model is 3GPP/25.943/RA-10. The signal/noise ratio (SNR) is determined as the ratio of the signal energy irradiated by all Tx antennas to the noise energy in every Rx antenna.

It is important for the effective operation of the new method that the detection order is set in accordance with the MMSE-OSIC procedure and, respectively, the symbol detection is performed using the weight matrix MMSE.

The embodiment of the new method is also possible, wherein the detection order is set in accordance with the Zero-Forcing procedure and, respectively, the symbol detection is performed using the Zero-Forcing weight matrix.

The embodiment of the new method is also possible, wherein the detection order is set in accordance with the descending sequence of the norms of the matrix columns.

TABLE 1

| Algorithm components | Conventional Method (4 candidates are used) | New method according to embodiments of the present disclosure (4 candidates are used) | Comments |
|---|---|---|---|
| Calculating the weight coefficient matrix | 189 | 472 | The new method additionally calculates 4×4 MMSE matrix, and the conventional method uses only 3×3 and lesser matrices |
| Applying the weight coefficient matrix | 144 | 160 | Obtaining solutions using the MMSE filtration |
| Calculating LLR for 4 layers | 128 + 480 * 3 | 32 + 128 * 3 + 21 | In order for obtaining the normalized Euclidean distance in the claimed method, 21 additional multiplications are utilized |
| Total | 1901 | 1069 | Complexity degree ratio is 1.778:1 |

FIG. 4 and FIG. 5 illustrate operational characteristics of the claimed method in comparison with conventional systems and standard linear MMSE detector. While the claimed method demonstrates some deterioration in comparison with conventional systems, it can be significantly better than the standard MMSE detector. This can be considered as a good compromise between the effectiveness and complexity for applying in specific devices.

FIG. 4 illustrates the receiver operation (bit error probability) according to embodiments of the invention; and, where the proposed solution is compared with the MMSE MIMO receiver and a conventional system. The simulation was car- It is important for the effective operation of the new method that the Euclidean distance and the LLR value are calculated in accordance with the equation:

$$LLR(b_i) = \left( \min_{A_p \in S_{i,0}} d_p - \min_{A_t \in S_{i,1}} d_t \right),$$

where $d_p$, $d_1$ mean the Euclidean distances to the signal constellation points having the i-th bit 0 ($A_p \in S_{i,0}$) and to points having the i-th bit 1 ($A_p \in S_{i,1}$).

The hardware implementation of the concept is illustrated in FIG. 1 and FIG. 2, and the operation of the method is explained in FIG. 3. In so doing, the new algorithm is simplified significantly, therefore it can be readily applied in the MIMO-OFDM systems being developed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for detecting a signal in the wireless communication systems using the Multiple Input Multiple Output (MIMO), the method comprising:
    determining a vector of signals received by several receiving antennas;
    estimating a channel between a plurality of transmitting antennas and a plurality of receiving antennas;
    forming a channel matrix;
    establishing, based on the channel state data, an order for detecting symbols transmitted by different ones of the plurality of transmitting antennas;
    calculating weight coefficients by a weight calculator that receives signal to noise information and established order and calculates weight for detecting the symbols in the MIMO system;
    detecting the symbols serially in the established order on the basis of the received signal vector;
    calculating the Euclidean distance between the detected symbols and the symbol constellation points;
    determining values of the Logarithmic Likelihood Ratio (LLR) for estimating a soft output bit probability, and
    forming a group of the most probable candidate symbols from the points of the symbol constellation, wherein the established order is based on a minimum mean square error (MMSE) filtering using signal/noise (SNR) information or based on a maximal weight of a channel matrix column.

2. The method of claim 1, wherein calculating the Euclidean distance comprises, determining, at a stage n, the Euclidean distance by means of a normalized sum of the Euclidean distances according to $$d_{i,k} = d_i + \frac{d_k}{\sigma_n^2},$$

where $d_i$ is the Euclidean distance calculated at a previous stage for the candidate having the index i, $\sigma_n^2$ is an estimation of an error variance in detecting the symbol at the stage n, $d_k$ is a Euclidean distance between the detected symbol and a point k of the constellation.

3. The method of claim 2, wherein determining further comprises forming a new group of the candidate symbols based on the minimum normalized Euclidean sum principle; and canceling the candidate symbols from an updated received data vector.

4. The method according to claim 1, wherein a detection order is set in accordance with a MMSE-OSIC procedure and, respectively, a symbol detection is performed using a weight matrix MMSE.

5. The method according to claim 1, wherein a detection order is set in accordance with a Zero-Forcing procedure and, respectively, a symbol detection is performed using a Zero-Forcing weight matrix.

6. The method according to claim 1, wherein a detection order is set in accordance with a descending sequence of norms of matrix columns.

7. The method according to claim 1, wherein the Euclidean distance and the LLR value are calculated in accordance with the equation:

$$LLR(b_i) = \left( \min_{A_p \in S_{i,0}} d_p - \min_{A_t \in S_{i,1}} d_t \right),$$

where $d_p$, $d_t$ mean the Euclidean distances to the symbol constellation points having the i-th bit 0 ($A_p \in S_{1,0}$) and to points having the i-th bit 1 ($A_p \in S_{1,1}$).

8. An apparatus configured to detect a signal in a wireless communication system using a Multiple Input Multiple Output (MIMO), the apparatus comprising:
    a signal sorter configured to receive an input of an information on parameters of a channel between a plurality of transmit antennas and a plurality of receive antennas;
    a weight calculator comprising a first input and a second input, the first input connected to an output of the signal sorter and the second input fed by an information on a signal to noise ratio;
    a symbol detector comprising:
        a first input connected to an output of the weight calculator,
        a second input fed by a received signal vector, and
        an output connected with an input of a Euclidean distance calculator;
    the Euclidean distance calculator and Logarithmic Likelihood Ratio (LLR) estimator comprising first output connected with a third input of the symbol detector via a best symbol candidate former and a candidate canceller;
    the best symbol candidate former; and
    the candidate canceller configured to update a received data vector without an eliminated candidate symbol, the updated vector fed to a third input of the symbol detector,
    wherein symbols transmitted by different ones of the plurality of transmit antennas are detected serially in accordance with an order determined by the signal sorter, and a second output of the Euclidean distance calculator is a source for data on a Logarithmic Likelihood Ratio (LLR) estimation, and wherein only information on the detected symbol and detection error variance estimation is fed to the input of the Euclidean distance calculator.

9. The apparatus according to claim 8, wherein the Euclidean distance calculator is configured to calculate a Euclidean distance by determining, at a stage n the Euclidean distance by means of a normalized sum of the Euclidean distances according to $$d_{i,k} = d_i + \frac{d_k}{\sigma_n^2},$$

where $d_i$ is a Euclidean distance calculated at a previous stage for the candidate having the index i, $\sigma_n^2$ is an estimation of an error variance in detecting the symbol at the stage n, $d_k$ is a Euclidean distance between the detected symbol and a point k of a signal constellation.

10. The apparatus according to claim 9, wherein the best candidate former is configured to form a new group of candidate symbols based on a minimum normalized Euclidean sum principle.

11. The apparatus according to claim 10, wherein the candidate canceller is configured to cancel candidate symbols from the updated received data vector.

12. The apparatus according to claim 9, wherein the detection order is set in accordance with a MMSE-OSIC procedure and a symbol detection is performed using a weight matrix MMSE.

13. The apparatus according to claim 9, wherein a detection order is set in accordance with a Zero-Forcing procedure and a symbol detection is performed using a Zero-Forcing weight matrix.

14. The apparatus according to claim 9, wherein a detection order is set in accordance with a descending sequence of norms of matrix columns.

15. The apparatus according to claim 9, wherein the Euclidean distance calculator is configured to calculate the Euclidean distance and the LLR value in accordance with the equation:

$$LLR(b_i) = \left( \min_{A_p \in S_{i,0}} d_p - \min_{A_t \in S_{i,1}} d_t \right),$$

where $d_p$, $d_t$ mean the Euclidean distances to the signal constellation points having the i-th bit 0 ($A_p \in S_{i,0}$) and to points having the i-th bit 1 ($A_p \in S_{i,1}$).

16. A mobile station capable of detecting a signal in a wireless communication system using the Multiple Input Multiple Output (MIMO), the mobile station comprising:
  a plurality of transmit antennas;
  a plurality of receive antennas; and
  an apparatus configured to decode signals in the wireless system, the apparatus comprising:
    a signal sorter configured to receive an input of an information on parameters of a channel between the plurality of transmit antennas and the plurality of receive antennas,
    a weight calculator comprising a first input and a second input, the first input connected to an output of the signal sorter and the second input fed by an information on a signal to noise ratio,
    a symbol detector comprising:
      a first input connected to an output of the weight calculator,
      a second input fed by a received signal vector, and
      an output connected with an input of a Euclidean distance calculator,
    the Euclidean distance calculator and Logarithmic Likelihood Ratio (LLR) estimator comprising first output connected with a third input of the symbol detector via a best symbol candidate former and a candidate canceller,
    the best symbol candidate former, and
    the candidate canceller, wherein symbols transmitted by different ones of the plurality of transmit antennas are detected serially in accordance with an order determined by the signal sorter, and a second output of the Euclidean distance calculator is a source for data on a Logarithmic Likelihood Ratio (LLR) estimation, and wherein only information on the detected symbol and detection error variance estimation is fed to the input of the Euclidean distance calculator.

17. The mobile station according to claim 16, wherein the Euclidean distance calculator is configured to calculate a Euclidean distance by determining, at a stage n, the Euclidean distance by means of a normalized sum of the Euclidean distances according to $$d_{i,k} = d_i + \frac{d_k}{\sigma_n^2},$$

where $d_i$ is a Euclidean distance calculated at a previous stage for the candidate having the index i, $\sigma_n^2$ is an estimation of an error variance in detecting the symbol at the stage n, $d_k$ is a Euclidean distance between the detected symbol and a point k of a signal constellation.

18. The mobile station according to claim 16, wherein the best candidate former is configured to form a new group of the candidate symbols based on a minimum normalized Euclidean sum principle.

19. The mobile station according to claim 18, wherein the candidate canceller is configured to cancel candidate symbols from the updated received data vector.

20. The mobile station according to claim 16, wherein the detection order is set in accordance with a MMSE-OSIC procedure and a symbol detection is performed using a weight matrix MMSE.

* * * * *